United States Patent [19]

Balsells

[11] Patent Number: 4,974,821
[45] Date of Patent: * Dec. 4, 1990

[54] CANTED-COIL SPRING WITH MAJOR AXIS RADIAL LOADING

[75] Inventor: Peter J. Balsells, P.O. Box 15092, Santa Ana, Calif. 92705

[73] Assignees: Peter J. Balsells; Joan C. Balsells, both of Santa Ana, Calif.

[*] Notice: The portion of the term of this patent subsequent to Feb. 21, 2006 has been disclaimed.

[21] Appl. No.: 348,419

[22] Filed: May 8, 1989

Related U.S. Application Data

[63] Continuation-in-part of Ser. No. 186,017, Apr. 25, 1988, Pat. No. 4,830,344.

[51] Int. Cl.$^5$ .............................................. F16F 1/06
[52] U.S. Cl. .................................... 267/167; 267/1.5; 267/180; 277/164; 285/318
[58] Field of Search ................... 267/167, 1.5, 180; 277/164, 163, 205, 153; 285/318, 305, 306, 321; 403/326, 334, 225, 361, 368

[56] References Cited

U.S. PATENT DOCUMENTS

| | | | |
|---|---|---|---|
| 4,655,462 | 4/1987 | Balsells | 267/167 X |
| 4,678,210 | 7/1987 | Balsells | 285/318 |
| 4,804,290 | 2/1989 | Balsells | 267/164 X |
| 4,805,943 | 2/1989 | Balsells | 285/305 X |
| 4,826,144 | 5/1989 | Balsells | 267/167 |
| 4,830,344 | 5/1989 | Balsells | 267/167 |
| 4,915,366 | 4/1990 | Balsells | 267/167 |

Primary Examiner—Douglas C. Butler
Attorney, Agent, or Firm—Walter A. Hackler

[57] ABSTRACT

A canted-coil spring includes a plurality of coils having a major and a minor axis and canted along a centerline defined by an intersection of the major and minor axis. The coils are interconnected in a manner forming a garter-type resilient canted-coil spring and a back angle of each coil, both defines the disposition of a trailing portion of each coil and determines the load-deflection characteristics of the canted-coil spring. A front angle defines the disposition of a leading portion of each coil and the garter-type resilient canted-coil spring is oriented for enabling the loading thereof to be generally radial in direction and along the major axis thereof.

23 Claims, 6 Drawing Sheets

FIG. 4a.
RADIAL SPRING COMPRESSED AXIALLY TURNED ANGLE 90°

FIG. 4b.
AXIAL SPRING TURNED 30° COUNTERCLOCKWISE

FIG. 4c.
AXIAL FLAT SPRING

FIG. 4d.
AXIAL SPRING TURNED 30° CLOCKWISE

FIG. 4e.
AXIAL SPRING TURNED 60° CLOCKWISE

CANTED-COIL SPRING WITH MAJOR AXIS RADIAL LOADING

The present application is a continuation-in-part of U.S. patent application Ser. No. 186,017, filed Apr. 25, 1988, now U.S. Pat. No. 4,830,344, issued May 16, 1989.

The present invention generally relates to canted-coil springs and seals and, more particularly, relates to canted-coil springs having means for orienting said spring for major axis radial loading and/or at a preselected turn angle for enabling a specific preselected resilient, or load-deflection, characteristics, in response to loading of the springs.

A general discussion of these types of garter-type springs appears in Mather U.S. Pat. Nos. 3,323,735 and 3,468,527. The prior art springs of Mather are limited in their application and specifically are limited to limitations in the slant angle of the coils as set forth therein.

Further advancement in spring design as set forth in U.S. Pat. No. 4,826,144 and U.S. Pat. No. 4,915,366 entitled "Inside Back Angle Canted Coil Spring" and "Outside Back Angle Canted Coil Spring", have enabled the design of springs having performance characteristics beyond that of the prior art.

The force-deflection characteristics of heretofore available garter-type axial springs have been varied by changing numerous spring parameters, including the wire size, the coil height, the coil spacing, and the front angle, known as the slant angle in the hereinabove referenced Mather patents, which defines a leading portion of each canted spring coil. While these parameters can be used effectively to tailor the load-deflection characteristics of the spring, they do not dominate or enable the spring to achieve its total design potential.

A heretofore unrecognized parameter substantially affecting the performance of garter-type axial loaded springs, is set forth in the companion patent application entitled, "Outside Back Angle Canted Coil Spring". This application discloses coils which are interconnected in a manner forming a garter-type axially resilient coil spring, with the trailing portion along an outside diameter of the garter-type axially resilient coil spring, and the leading portion along an inside diameter of the garter-type axially resilient coil spring. This feature provides for the capability of tailoring a garter-type axially resilient coil spring beyond the range of conventional garter-type axially resilient coil springs heretofore known.

This feature enables a spring to be formulated with a higher load-deflection characteristics. That is, the spring is able to exert a greater force in response to a given deflection than a spring having the same dimensions and wire size with a trailing portion along the inside diameter of the spring.

As a result, these springs can be fabricated from smaller wire and have a closer coil spacing, while still exerting the same force in response to deflection as prior art springs.

It should be recognized that this characteristic is important, particularly when the springs are used in conjunction with a seal. Because seals are generally made from a soft material to enhance their sealing characteristics, they must be evenly loaded. That is, the stress concentration on the seal should be uniform in order that relatively high and low pressure points do not occur across the face of the seal, which leads to inefficient sealing. When this occurs, the high pressure points are subject to greater force and consequently greater wear, while at the same time, the necessary sealing force may not be provided in the low pressure points, the latter leads to providing unnecessarily high force concentration to the spring in order to effect proper sealing.

The present invention is related to the discovery that of other parameters which can be utilized to design garter-type axially loaded springs having preselected load-deflection characteristics.

First, it has been found that the turn angle, as hereinafter defined and discussed, can be utilized in the fabrication of garter-type axially loaded springs having higher load-deflection characteristics than heretofore fabricated springs utilizing the same wire diameters. The advantages of higher loading have been hereinabove discussed. In addition, the specific relationship and working resilient range of springs made in accordance with the present invention, can also be used to advantage and provide springs with tailored load-deflection characteristics which were not heretofore possible.

Second, it has been found that loading of the garter-type springs along the major axis thereof, as hereinafter discussed, with or without variation of the turn angle provides additional means for tailoring the load-deflection characteristics of the spring and causing such spring to cant along the major axis thereof radially from the inside or radially from the outside under an applied radial force.

It should be appreciated that in order for the spring to cant upon major axis radial loading, it needs to be contained in a cavity in an axial manner. It has been found that when the spring is in a free position and loaded along the major axis in a radial direction, it will resist canting or not cant at all.

In addition, the spring may be mounted, or contained, in a position wherein it will cant radially along the major axis and radially along the minor axis under application of both a radial and axial force.

It is important to recognize that while many parameters affecting the load-deflection characteristics of the garter-type springs, such as those hereinabove recited in connection with the discussion of the prior art, have little, or significantly different effect on the resilient characteristics of the spring, if the coils are not free to flex or bend in an uninhibited manner. For example, Bram discloses in U.S. Pat. No. 3,183,010, a reinforcement for a sealing element which takes the shape of a garter-type spring, and in fact, discloses a turn angle in that reinforcement element.

However, this disclosure of a reinforcement element, while in the shape of a spring, is not free to flex, because it is imbedded in the body of a sealing element so as to be flush with the surface thereof. It is obvious that when so imbedded, this reinforcement element, or spring, is not free to flex with the load-deflection characteristics that it would have in free space, that is, uninhibited deflection under load.

The spring, in accordance with the present invention, provides operational load-deflection characteristics which may be used to advantage in the design of springs for applications heretofore not possible. It is particularly true when the spring, in accordance with the present invention, is used in combination with a sealing material.

SUMMARY OF THE INVENTION

In accordance with the present invention, canted-soil spring apparatus includes a plurality of coils having a major and a minor axis and canted along a centerline defined by an intersection of the major and minor axes. The coils are interconnected in a manner forming a garter-type axially resilient canted-soil spring with back angle means for both defining the disposition of a trailing portion of each coils with respect to a line normal to the centerline and for determining the load-deflection characteristics of the canted-coil spring.

Further, front angle means are provided for defining the disposition of a leading portion of each coil with respect to the normal line, with said front angle means being greater than said back angle means.

Means are provided for non-invasively supporting the garter-type axially resilient coil spring in a preselected orientation for controlling the resilient characteristics of the garter-type axially resilient canted-soil spring.

More specifically, the means for non-invasively supporting the garter-type axially resilient coil spring may include means defining a cavity for enabling the garter-type coil spring to be radially loaded along the major axis thereof, or alternatively, radial loading of the garter-type spring along the major axis and axial loading along the minor axis thereof, while supporting the garter-type spring with a turn angle of greater than 0 degrees and less than 90 degrees.

BRIEF DESCRIPTION OF THE DRAWINGS

The advantages and features of the present invention will appear from the following description, when considered in conjunction with the accompanying drawings in which.

DETAILED DESCRIPTION

Figure 1:
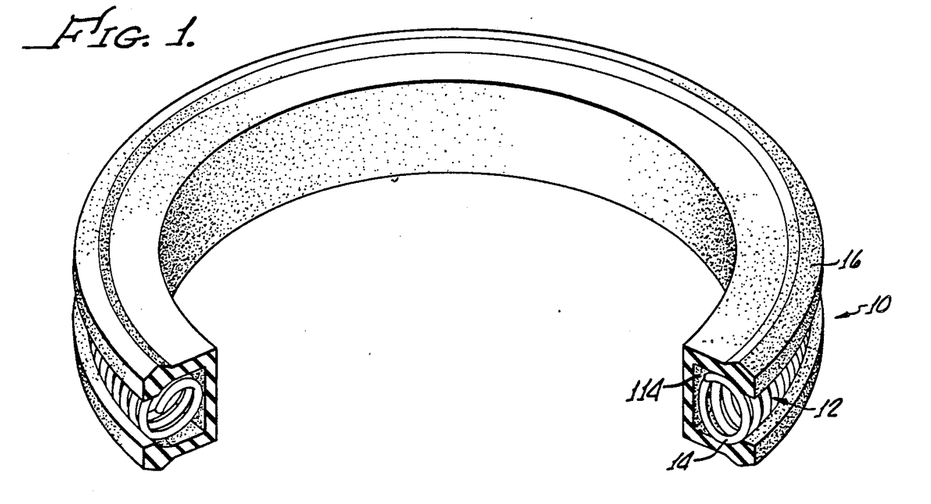
FIG. 1 is a perspective view of an annular axially resilient coil spring seal, generally showing a plurality of coils interconnected in a manner forming a garter-type axially resilient coil spring, with the spring being disposed in an annular seal with a preselected turn angle orientation for controlling a resilient characteristics of the annular axially resilient coil spring, non-invasive support of the spring within the annular seal enabling independent working of the spring therein, thereby providing preselected force concentration on the sealing portions of the seal.

Turning now to FIG. 1, there is shown a garter-type axially resilient coil spring and seal 10, in accordance with the present invention, generally showing a garter-type axial spring 12 with a plurality of coils 14 in an annular seal 16 which provides means for non-invasively supporting the garter-type axially resilient coil spring 12, in a preselected orientation for controlling the resilient characteristics thereof, as hereinafter described in greater detail.

Figure 2:
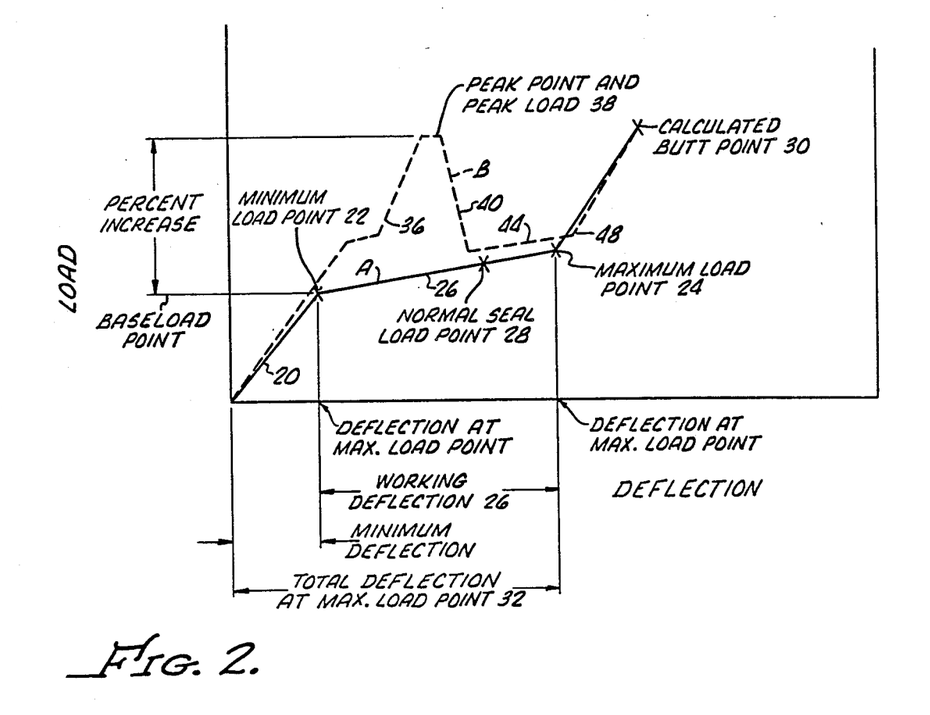
FIG. 2 shows load deflection curves for prior art springs and springs made in accordance with the present invention.

In FIG. 2, there is shown a load-deflection curve A, representative of the prior art, for the purpose of illustrating the characteristics of the canted coil garter-type axially resilient coil springs. Also shown is a load-deflection curve B for a spring made in accordance with the present invention for the purpose of illustrating the characteristics thereof.

As shown by curve A when a load is axially applied to an axial annular spring, the spring deflects in a general linear fashion as shown by the line segment 20 until it reaches minimum load point 22, which represents the point at which, after initial deflection, the load begins to remain relatively constant.

Between the minimum load point 22 and a maximum load point 24, the load-deflection curve may be constant or show a slight increase, as shown in FIG. 2. The area between the minimum load point 22 and the maximum load point 24 is known as the working deflection range 26. The spring is normally loaded for operation within this range, as indicated by point 28, for a typical spring utilized in conjunction with seal, gasket, or the like, for sealing purposes.

Loading of the spring beyond the maximum load point 24 results in abrupt deflection response until it reaches a butt point 30, which results in a permanent set in the spring as a result of overloading. Also indicated in FIG. 2, is the total deflection range 32 which is defined as the deflection between the unloaded spring and the deflection at the maximum load point 24.

Also shown in FIG. 2, is a load-deflection curve B showing the characteristics of the spring 12 made in accordance with the present invention, showing a linear load-deflection segment 36 until a peak load point 38 is reached. After the peak point 38, the load decreases with deflection in segment 40. This results in a saddletype deflection range between the peak point 38 and the butt point 30.

This type of load-deflection characteristic may have specific advantage for spring seals which are locked in position, such as a groove, with the tension thereof being caused by the spring. In this instance, while the spring produces a relatively constant load over a given working deflection range 44, changes beyond the working range limits at points 46, 48, causes an abrupt increase in load. This causes the spring seal to be self-centering within a groove, or the like.

Other applications in which the spring of the present invention may be used to advantage include static applications where a heavy load is desired with no increase in wire diameter or spacing of coils. Still another application is where a heavy initial load is desired such as in seals subjected to cryovac temperature and the like.

Figure 3:
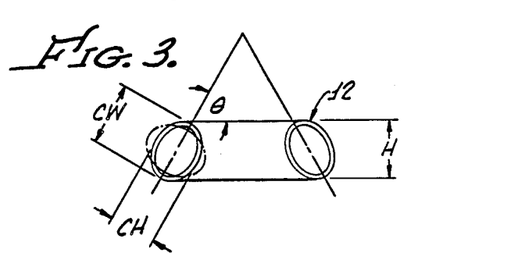
FIG. 3 is a schematic of an axially canted coil spring with turn angle θ shown for the purpose of illustrating how the turn angle θ may be calculated.
Figure 4A:
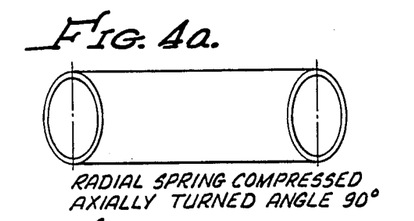
FIGS. 4a, b, c and d and e illustrate axial springs having various turn angles.

FIG. 3 shows a schematic form a cross-section of a canted coil spring, in accordance with the present invention, with a turn angle of a measured coil width of CW, a measured coil height of CH and a measured spring height H of the spring 12, as shown in FIGS. 4a, b, c and d. The turn angle may be clockwise (bold lines) or counterclockwise. (Dashed lines).

Figure 4B:
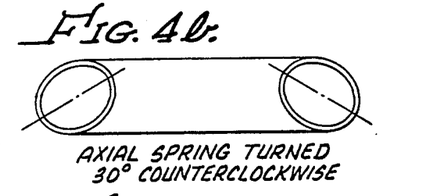
Figure 4C:
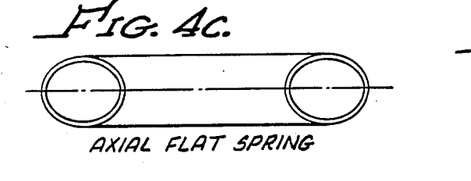
Figure 4D:
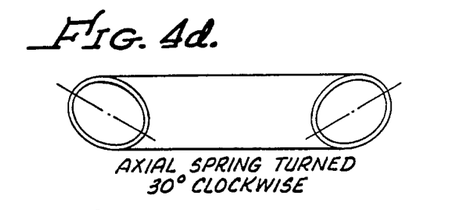
Figure 4E:
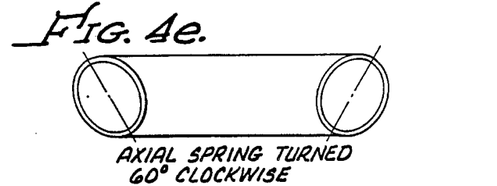

As shown in FIG. 4a, an axially flat spring may be turned up counterclockwise, for example, 30 degrees, as shown in FIG. 4b, or turned clockwise, as for example, shown in FIGS. 4c and 4d, with 30 degrees and 60 degrees turn angles, respectively. It should be appreciated that while the springs shown are shown with a circular shape, other shapes are possible, such as elliptical or rectangular, depending upon the configuration of the mating parts between which the spring 12 and/or seal 16 are to be placed. In addition, as shown in FIG. 4a, the spring is free floating and upon axially loading, it will tend to turn inward assuming an axial portion upon loading.

As shown in the Figures, the turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading, is independent upon whether the spring is in the cone shape as shown in FIG. 4b, or an inverted cone as shown in 4c. That is, the springs in 4b and 4c will perform in identical fashion.

Figure 5:
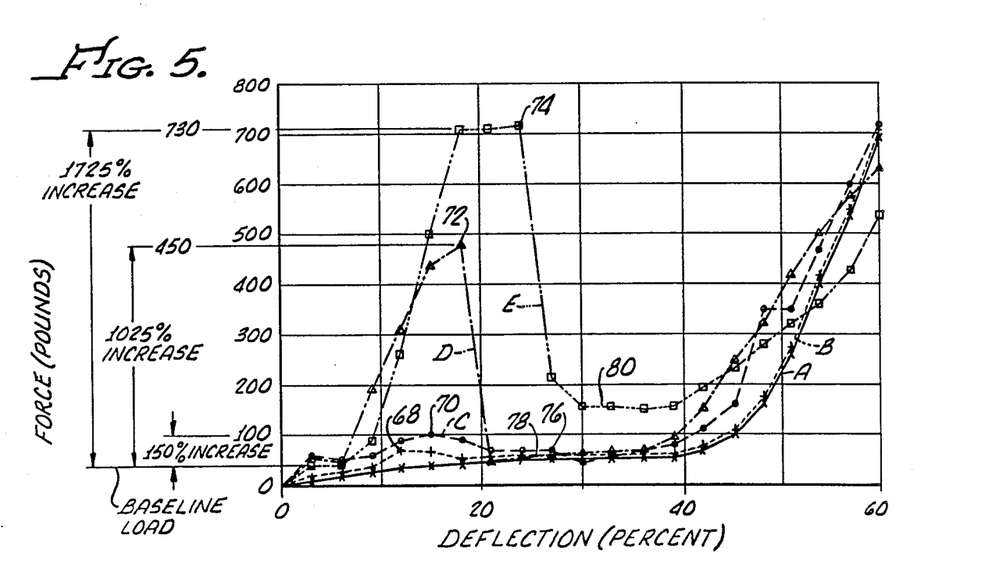
FIG. 5 is a plurality of force-deflection curves, each corresponding to an annular axially resilient coil spring having different turn angle orientation.
Figure 6A:
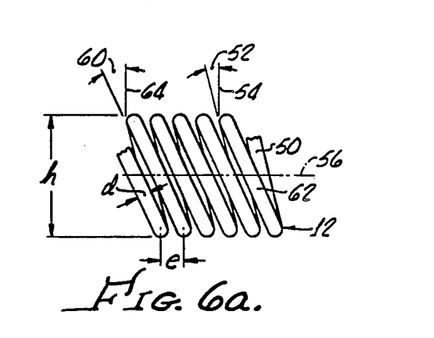
FIGS. 6a, b are side views of springs showing leading and trailing portions of coils defined by front and back angles, respectively.
Figure 6B:
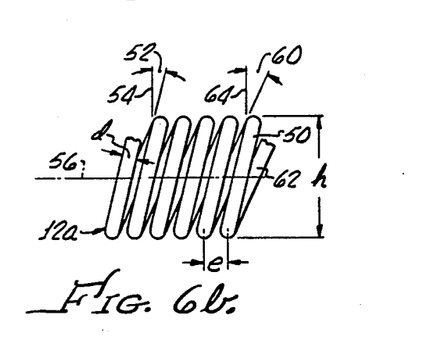

Curves A, B, C and D, in FIG. 5 show the force-deflection characteristics of a series of springs, with $\theta$ varied from zero degrees to 90 degrees, with a specification of these springs being set forth in Table 1. Each of the springs A, B, C, D, are identical in all respects, except for the turn angle $\theta$. As described in copending application Ser. Nos. 186,016 and 186,018, springs A, B, C, D, are constructed having a specific trailing portion 50 defined by a back angle 52 made between the trailing portion 50 and a normal 54 to centerline 56 of the spring. See FIGS. 6a and b. In addition, a front angle 60 defines a leading portion 62 of the spring 10 by the angle the leading portion 62 makes with a normal 64 to the centerline 56. FIG. 6a shows the spring 12 having the trailing portion 50 along the inside diameter of the spring, with FIG. 6b showing the spring 12a having the trailing portion 50 along the outside diameter of the spring. As can be seen, from FIGS. 6a and b, as each coil is traced in a circular-like manner about the centerline, each revolution includes a trailing portion and a leading portion, with the leading portion advancing movement along the centerline more than the advancement along the centerline when following the trailing portion of the coil.

TABLE 1

Spring Height (CH) = 0.163 in.
Coil Width (CW) = 0.180 in.
Turned Height (H) = 0.179 in.
Wire Diameter (WD) = 0.222 in.
Coil Spacing = 0.018 in.
Number of Coils = 67

| Spring | Turn Angle (deg.) | Peak Load Value (lbs.) | Increase Over Base Load (%) |
|---|---|---|---|
| A | 0 | NA | NA |
| B | 15 | 100 | 100% |
| C | 58 | 100 | 150% |
| D | 76 | 450 | 1025% |
| E | 90 | 730 | 1725% |

A more detailed description of inside back angle canted coil springs and outside angle canted coil springs may be had from the hereinabove referenced copending patent applications which are herewith expressively incorporated by reference thereto. The effect of the trailing portion being disposed on the inside or the outside of the canted coil spring 12 will be hereinafter discussed in greater detail.

Turning back to FIG. 5, curve A represents a spring with a turn angle of zero and is representative of the prior art curve A, shown in FIG. 2. Curve B represents a spring having a turn angle of 15 degrees and manifests a threshold rise 68, characteristic of springs made in accordance with the present invention. This gradual rise develops into the peak load characteristics more clearly shown by curves C, D and E, corresponding to springs C, D and E. of Table 1.

As shown in FIG. 5, as the turn angle $\theta$ increases, the load increases at a maximum about 90 degrees. Importantly, after the peak load, as shown at 70, 72, 74, respectively, is achieved, the force decreases rapidly to approximately the forces shown by springs A and B. Thus, these springs have working regions 76, 78 and 80, approximately the same as unturned spring A; however, as can be seen in FIG. 5, these working areas are bounded by steep load-deflection characteristics. Springs, in accordance with the present invention, have advantages in a variety of applications, as hereinabove described. As hereinbefore mentioned, although the springs shown generally are circular in shape, they could be used in other applications in irregular shapes. That is, the spring will easily fit into other shapes than round.

As shown in Table 1, the peak load is substantially greater than the base load and in fact reaches to 1725 percent when the turn angle is 90 degrees. Hence, by using a turn angle, higher load can be provided. Consequently, as hereinbefore mentioned, a smaller wire can be used which will permit the use of more coils per inch thus decreasing the stress that will occur on the seal when loaded. This results in longer life springs because the stress concentration thereacross is more uniform.

Also, as hereinbefore pointed out, springs, in accordance with the present invention, exhibiting the force-deflection curves as shown by curve C, D and E of FIG. 5, can be used in self-locking and self-centering applications not heretofore possible by springs exhibiting force-deflection curves as shown by curves A.

Figure 7:
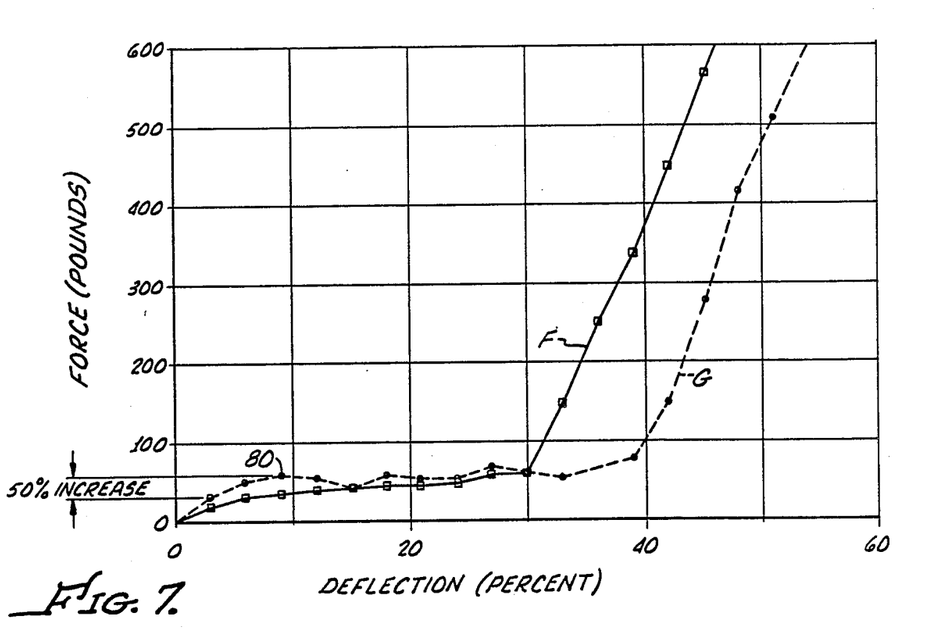
FIG. 7 is a force-deflection curve showing the effects of multiple deflection on the force-deflection characteristics of an annular axially resilient coil spring having a preselected turn angle.

It has been found that curves A through E are representative of springs whether the trailing portion is on the outside or inside of the spring. This is shown in FIG. 7 showing curves F and G corresponding to springs F and G having specifications set forth in Table 2. As shown, curve F shows the force-deflection curve for a spring having a trailing portion on the outside diameter of the spring and curve G shows the annular spring 12 having the trailing portion on the inside of the annular spring 12, while curve G shows the load-deflection

TABLE 2

| Spring | # of Coils | Coil Height (in) | Coil Width (in) | Turned Height (in) | Wire Dia. (in) | Turn Angle (deg) | Coil *Spacing (in) | Trailing Portion |
|---|---|---|---|---|---|---|---|---|
| F | 67 | 0.162 | 0.179 | 0.164 | 0.022 | 32° | 0.018 | Outside diameter |
| G | 67 | 0.162 | 0.179 | 0.164 | 0.022 | 42° | 0.018 | Inside diameter |

*Actual spacing between coils, not to be confused with the pitch, e, of the spring, see FIGS. 6a, 6b.

characteristics of a spring having the trailing portion on the inside of the spring. Since the turn angle of spring G is greater than the turn angle of F, a peak load portion 80 begins to manifest itself.

A great number of springs have been tested and the performance represented by curves A through G in FIGS. 5 and 7 are representative of springs made with a back angle between one degree and 45 degrees. Particularly the springs are also representative of springs wherein the front angle is less than 35 degrees.

Figure 8:
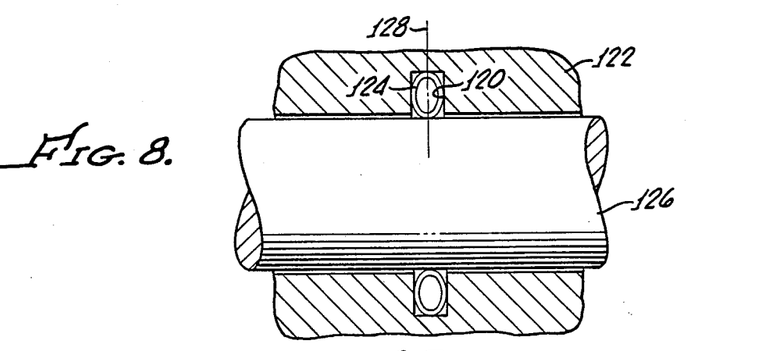
FIG. 8 is a cross-section of a spring in accordance with the present invention disposed in a groove.

A cavity 114 of the axial seal 16 as shown in FIG. 1 may provide means for non-invasivey supporting the canted coil spring in a preselected orientation in order to control the resilient characteristics of the canted coil spring. Alternatively, as shown in FIG. 8, a groove 120 in a housing 122 or the like may support a spring 124, made in accordance with the present invention, against a shaft 126 or the like and thereby provide means for orienting the spring 124 and enabling loading thereof along the major axis 128 thereof.

Figure 9:
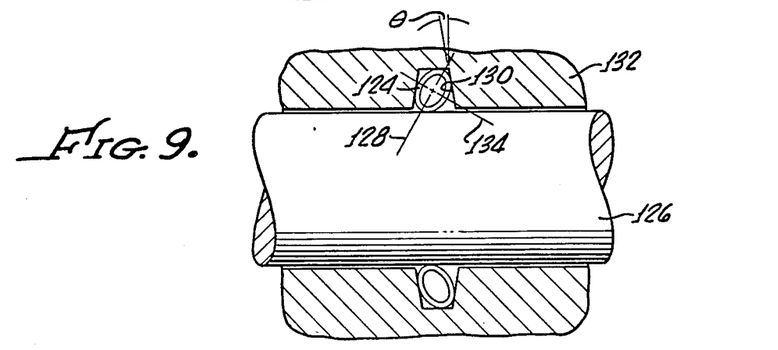
FIG. 9 is a cross-section of a spring in accordance with the present invention disposed in a tapered groove.

As shown in FIG. 9, a tapered groove 130 in a housing 132 may support the spring 124 for both loading along the major axis 128 and minor axis 134. In this instance, a groove taper $\theta$ causes loading along the minor axis 132 when the spring is compressed along the major axis when the shaft 126 bears thereagainst.

For determining the load-deflection characteristics of spring made in accordance with the present invention fixtures, or jigs, 140, 142, 144 and 146 shown in cross-section in FIGS. 10, 11, 12 and 13 may be employed.

Figure 10:
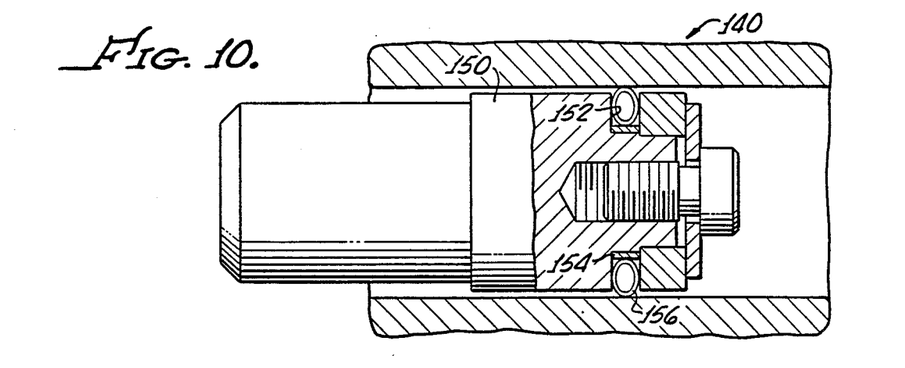
FIG. 10 is a jig for determining the load-deflection characteristics of springs made in accordance with the present invention.

In general, the fixture 140 includes a piston 150 with a groove 152 and spacers 154 that vary in thickness in order to radially compress the inside diameter of the spring 156 toward the outside diameter. Specific load-deflection characteristics for spring loaded in this manner will be discussed hereinafter.

Figure 11:
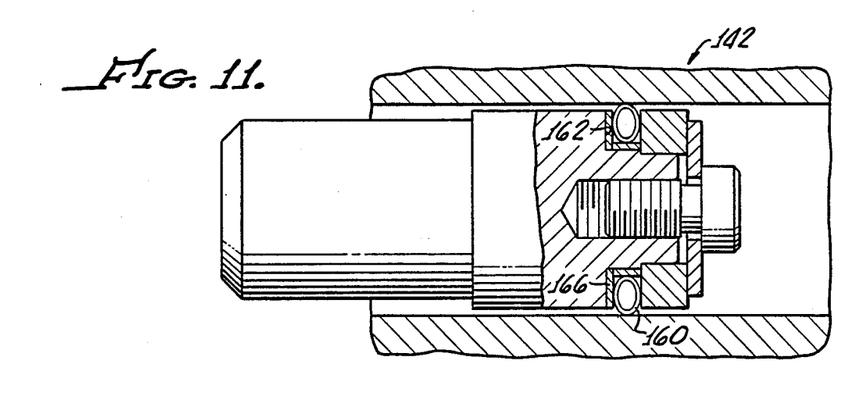
FIG. 11 is a jig for determining the load-deflection characteristics of springs made in accordance with the present invention.

The fixture 142 is similar to jig 140 in that a spring 160 is compressed in a groove 162 with spacers 164 to radially compress the spring 160. In addition, spacers 166 are used for loading the spring 160 in an axial manner by varying the thickness of the spacers 166.

Figure 12:
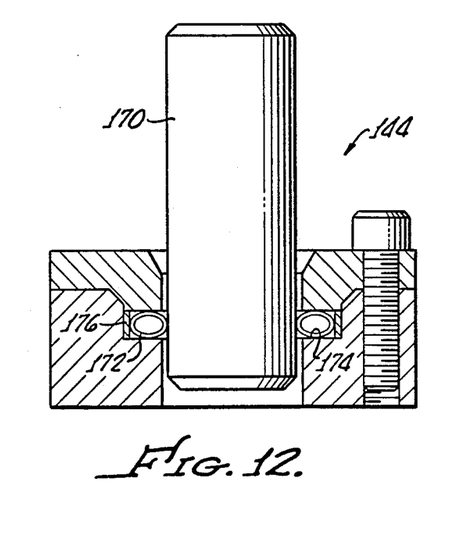
FIG. 12 is a jig for determining the load-deflection characteristics of springs made in accordance with the present invention.
Figure 13:
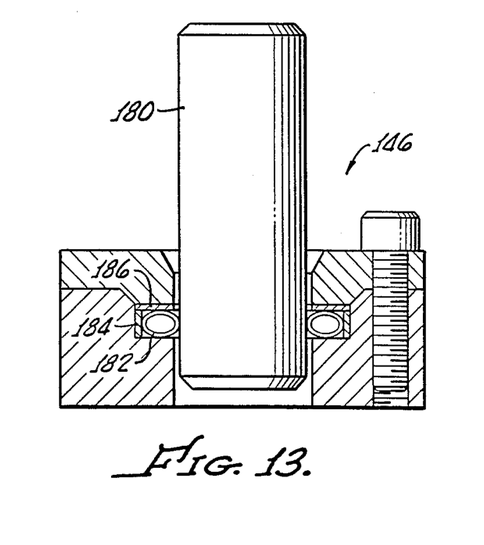
FIG. 13 is a jig for determining the load-deflection characteristics of springs made in accordance with the present invention.

Fixture 144 utilizes a piston 170 for radially compressing a spring 172 within a groove 174 and spacers 176 compress the spring 172 from an outside diameter thereof toward an inside diameter thereof, whereas fixture 146 utilizes a piston 180 for radially compressing a spring 182 with spacers 184 and axially loading the spring 182 with spacers 186.

FIGS. 14–17 show load deflection characteristics for types of springs made in accordance with the present invention. Specific examples of such springs are as follows.

| SPRING - Type A | |
|---|---|
| Wire dia. | 0.022 inches |
| Coil height | 0.161/0.163 inches |
| Back angle | 13/15 degrees |
| Front Angle | 29/31 degrees |
| Coil spacing | 0.017/0.019 inches |

The spring was made with an inside diameter of 0.750 inches with 58 coils and various springs were used having a back angle on the I.D. and some having the back angle on the O.D. In addition, such springs had the following general information. A turn angle at 0 degrees, at 30 degrees, at 55 degrees, and at 90 degrees. The turn angle varied depending on each particular spring.

| SPRING - Type B | |
|---|---|
| Wire dia. | 0.022 inches |
| Coil height | 0.161/0.163 inches |
| Back angle | 15.5/17 degrees |
| Front angle | 37/39 |
| Coil spacing | 0.032/0.034 inches |

Spring Type B has a greater spacing between coils, approximately 1.83 times greater than the spacing between coils of spring Type A. By increasing the spacing between coils, other parameters, based on loading, deflection, etc., can be determined.

The spring in a welded position had a reference I.D. of 0.750 and 42 coils. The spring was also made with the back angle on the I.D. and back angle on the O.D. and within those parameters, in turn angles, that varied from 0, 30, 55 and 90 degrees.

Figure 14:
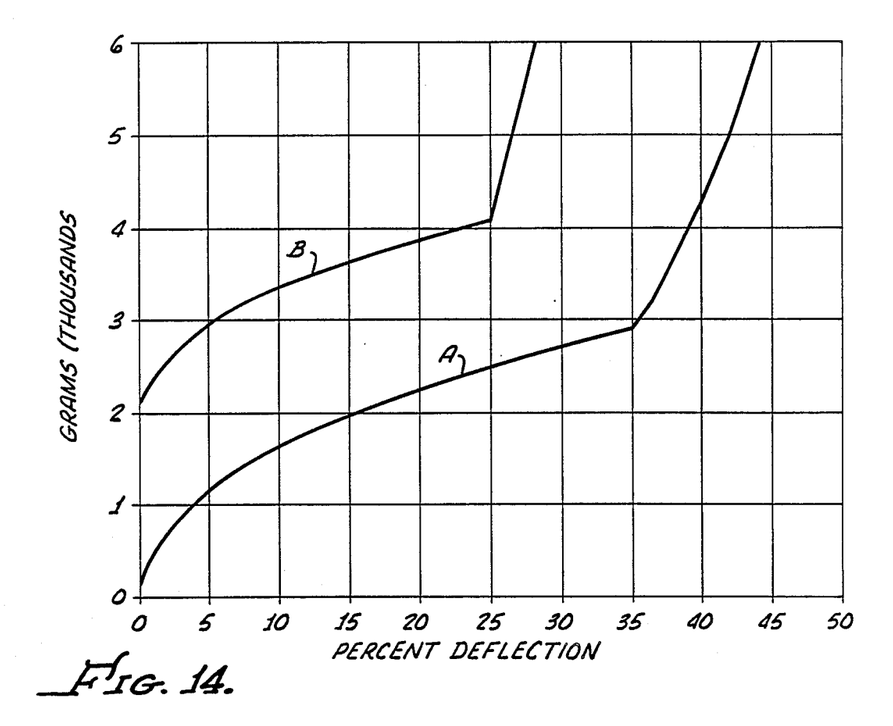
FIG. 14 shows a load-deflection characteristics for springs made in accordance with the present invention.

FIG. 14 shows a comparison between spring Type A and spring Type B with the curves therein showing the average load-deflection characteristics for various turn angles. It should be appreciated that spring Type A, the back angle on the inside diameter of the spring, has a substantially greater degree of deflection than spring Type B with the back angle on the outside diameter of the spring.

Figure 15:
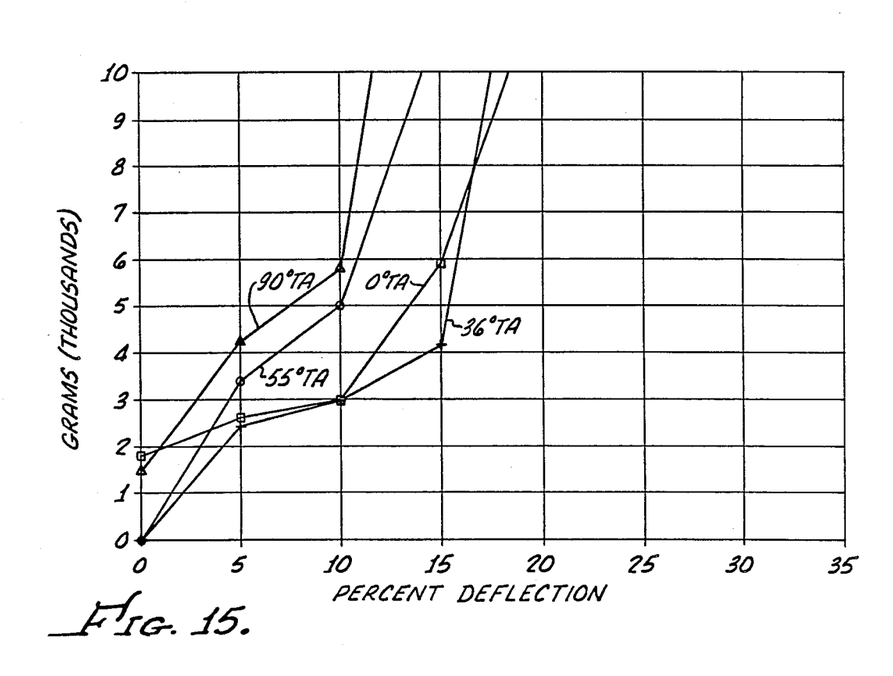
FIG. 15 shows a load-deflection characteristics for springs made in accordance with the present invention.

Shown in FIG. 15 is the force versus deflection characteristics for an A Type spring with turn angles (TA) that vary from 0, 36, 55 and 90 degrees and inserted into the Fixture 144 shown in FIG. 12 for loading the spring radially along the major axis with deflection occurring from the inside diameter toward the outside diameter and also along the minor axis in an axial manner. It should be appreciated that the degree of deflection obtained when loading the spring radially and axially is reduced substantially and generally, varies from 10 to 15 percent.

It has been determined that when loading the spring in a radial and an axial manner, the degree of deflection substantially decreases. A spring with the back angle on the outside diameter has substantially lower deflection than the spring with a back angle on the inside diameter.

Figure 16:
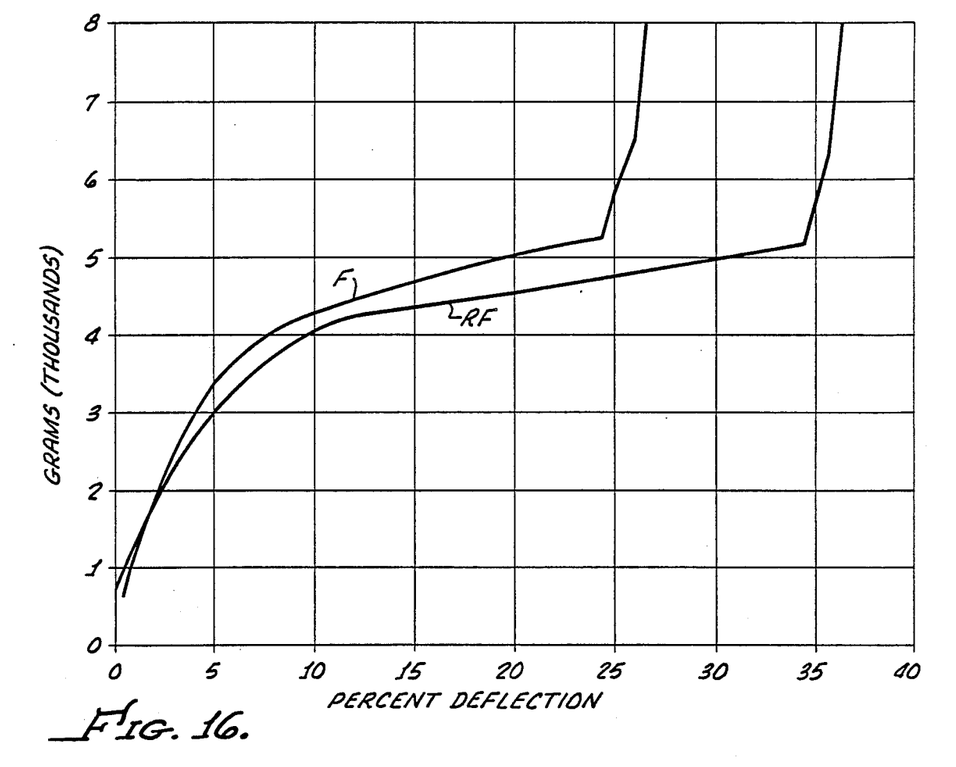
FIG. 16 shows a load-deflection characteristics for springs made in accordance with the present invention.
Figure 17:
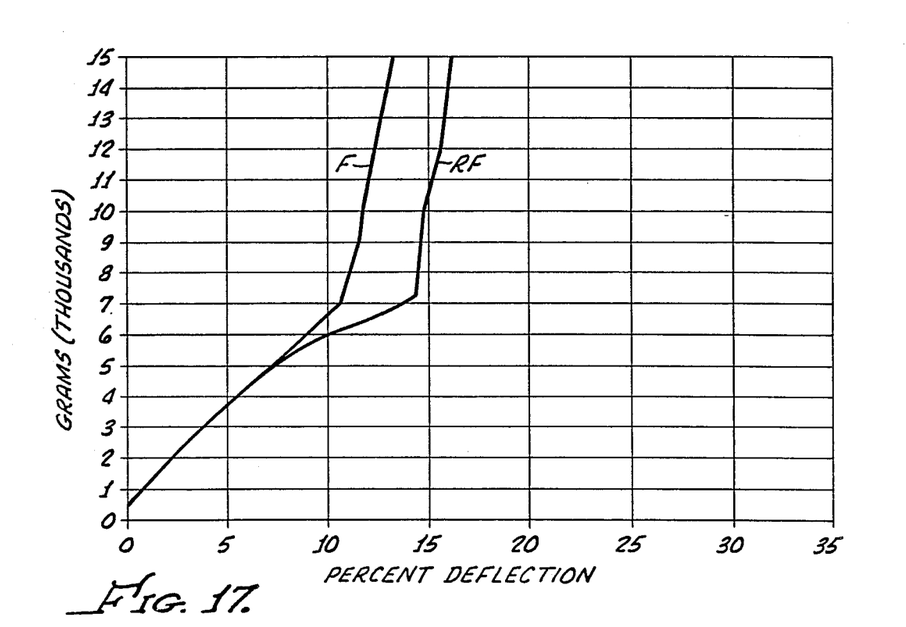
FIG. 17 shows a load-deflection characteristics for springs made in accordance with the present invention.

FIG. 16 is a load-deflection comparison between axial springs for the back angle on the O.D., curve F, than a spring having a back angle on the inside diameter curve RF. As shown, a spring with the back angle on the inside diameter has a substantially greater degree of deflection, by approximately 40 percent, than the same spring with a back angle on the outside diameter. FIG. 17 shows the load-deflection curves for axial springs having a back angle on the I.D. RF and a back angle on the O.D. outside diameter, curve F. These characteristics occur when the spring is loaded radially and axially at the same time with the deflection of the spring being made radially from the outside diameter toward the inside diameter. This should be compared with the same spring loaded from the inside diameter which is shown in FIG. 15.

By varying the spring parameters and loading direction of the spring, springs in accordance with the present invention may be tailored to fit a wide range of load-deflection characteristics, otherwise unattainable by prior art springs. This is particularly true when the wire size and number of coils may be dictated by other factors, as for example, the size of the cavity into which the spring must be disposed.

Although there has been described hereinabove specific springs in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. Canted coil spring apparatus comprising:
   a plurality of coils having a major and a minor axis and canted along a centerline defined by an intersection of the major and minor axis, said coils being interconnected in a manner forming a garter-type axially resilient canted coil spring;
   back angle means for both defining the disposition of a trailing portion of each coil with respect to a line normal to the centerline and for determining the load-deflection characteristics of the canted coil spring;
   front angle means for defining the disposition of a leading portion of each coil with respect to the normal line, said front angle means being greater than said back angle means; and
   means for non-invasively supporting the garter-type axially resilient coiled spring in a preselected orientation for controlling the resilient characteristics of the garter-type axially resilient canted coil spring, said last recited means including means defining a cavity for enabling said garter-type axially resilient coil spring to be loaded along the major axis thereof and cant along the major axis thereof.

2. Canted coil spring apparatus comprising:
   a plurality of coils having a major and a minor axis and canted along a centerline defined by an intersection of the major and minor axis, said coils being interconnected in a manner forming a garter-type axially resilient canted coil spring;
   back angle means for both defining the disposition of a trailing portion of each coil with respect to a line normal to the centerline and for determining the load-deflection characteristics of the canted coil spring;
   front angle means for defining the disposition of a leading portion of each coil with respect to the normal line, said front angle means being greater than said back angle means; and
   means for non-invasively supporting the garter-type axially resilient coiled spring in a preselected orientation for controlling the resilient characteristics of the garter-type axially resilient canted coil spring, said last recited means including means defining a cavity to enable said garter-type axially resilient coil spring to be loaded along both the major and the minor axis thereof.

3. The canted coil spring apparatus according to claims 1 or 2 wherein the trailing portion is disposed along an outside diameter of the garter-type axially resilient canted coil spring and the leading portion is disposed along an inside diameter of the garter-type axially resilient coiled spring.

4. The canted coil spring apparatus according to claims 1 or 2 wherein the trailing portion is disposed along an inside diameter of the garter-type spring resilient coiled spring and the leading portion is disposed along an outside diameter of the garter-type axially resilient coiled spring.

5. The canted coil spring apparatus according to claim 1 wherein the back angle is selected to provide a load-deflection characteristics in which the load remains relatively constant within a working deflection.

6. The canted coil spring apparatus according to claim 1 wherein the back angle means defines the trailing portion at a disposition with a back angle, with respect to the normal line of greater than zero degrees.

7. The canted coil spring apparatus according to claim 6 wherein the front angle means defines the leading portion at a disposition with a front angle, with respect to the normal line of greater than zero degrees.

8. The canted coil spring apparatus according to claim 1 wherein said means for non-invasively supporting the garter-type springs includes means defining a groove having tapered walls for causing axial loading of the canted coil spring upon radial loading thereof.

9. Canted coil spring apparatus comprising:
   a plurality of coils having a major and a minor axis and canted along a centerline defined by an intersection of the major and minor axis, said coils being interconnected in a manner forming a garter-type axially resilient canted coil spring;
   back angle means for both defining the disposition of a trailing portion of each coil with respect to a line normal to the centerline and for determining the load-deflection characteristics of the canted coil spring;
   front angle means for defining the disposition of a leading portion of each coil with respect to the normal line, said front angle means being greater than said back angle means; and
   means for orienting said garter-type resilient canted coil spring and enabling loading thereof along the major axis thereof.

10. The canted coil spring apparatus according to claim 9 wherein said means for orienting said garter-type axially resilient coil spring includes means defining a cavity for enabling said garter-type axially resilient coil spring to be loaded along the major axis thereof and cant along the major axis thereof.

11. The canted coil spring apparatus according to claim 9 wherein said means for orienting said garter-type axially resilient coil spring includes means defining a cavity for enabling said garter-type axially resilient coil spring to be loaded along both the major and the minor axis thereof.

12. The canted coil spring apparatus according to claim 9 wherein said means for orienting said garter-type axially resilient coil spring includes means defining a cavity for supporting and orienting said garter-type axially resilient coiled springs with a turn angle of greater than zero degrees and less than 90 degrees.

13. The canted coil spring apparatus according to claims 9, 10, 11 or 12 wherein the trailing portion is disposed along an outside diameter of the garter-type axially resilient coiled spring and the leading portion is disposed along an inside diameter of the garter-type axially resilient coiled spring.

14. The canted coil spring apparatus according to claims 9, 10, 11 or 12 wherein the trailing portion is disposed along an inside diameter of the garter-type axially resilient coiled spring and the leading portion is disposed along an outside diameter of the garter-type axially resilient coiled spring.

15. The canted coil spring apparatus according to claim 9 wherein the means for orienting said garter-type axially resilient coiled spring includes means for enabling spring deflection to occur on the inside diameter thereof.

16. The canted coil spring apparatus according to claim 9 wherein the means for orienting said garter-type axially resilient coiled spring includes means for enabling spring deflection to occur on the outside diameter thereof.

17. The canted coil spring apparatus according to claim 9 wherein the back angle is selected to provide a load-deflection characteristics in which the load remains relatively constant within a working deflection.

18. The canted coil spring apparatus according to claim 9 wherein the back angle means defines the trailing portion at a disposition with a back angle, with respect to the normal line, of greater than zero degrees.

19. The canted coil spring apparatus according to claim 18 wherein the front angle means defines the leading portion at a disposition with a front angle, with respect to the normal line, of greater than zero degrees.

20. The canted coil spring apparatus according to claim 9 further comprising means defining spacing between each coil in said plurality of coils, for enabling the coils to abut upon loading thereof.

21. The canted coil spring apparatus according to claim 20 wherein said means for orienting said garter-type spring includes means defining a groove having tapered wall, for causing axial loading of the canted coil spring upon radial loading thereof.

22. The canted coil spring apparatus according to claim 9 wherein said coils are interconnected to form a radial canted coil spring.

23. The canted coil spring apparatus according to claim 9 wherein said coils are interconnected to form an axially canted coil spring.

* * * * *